Feb. 5, 1935.  J. BOAS ET AL  1,989,674
COUPLING
Filed Aug. 25, 1933  2 Sheets-Sheet 1
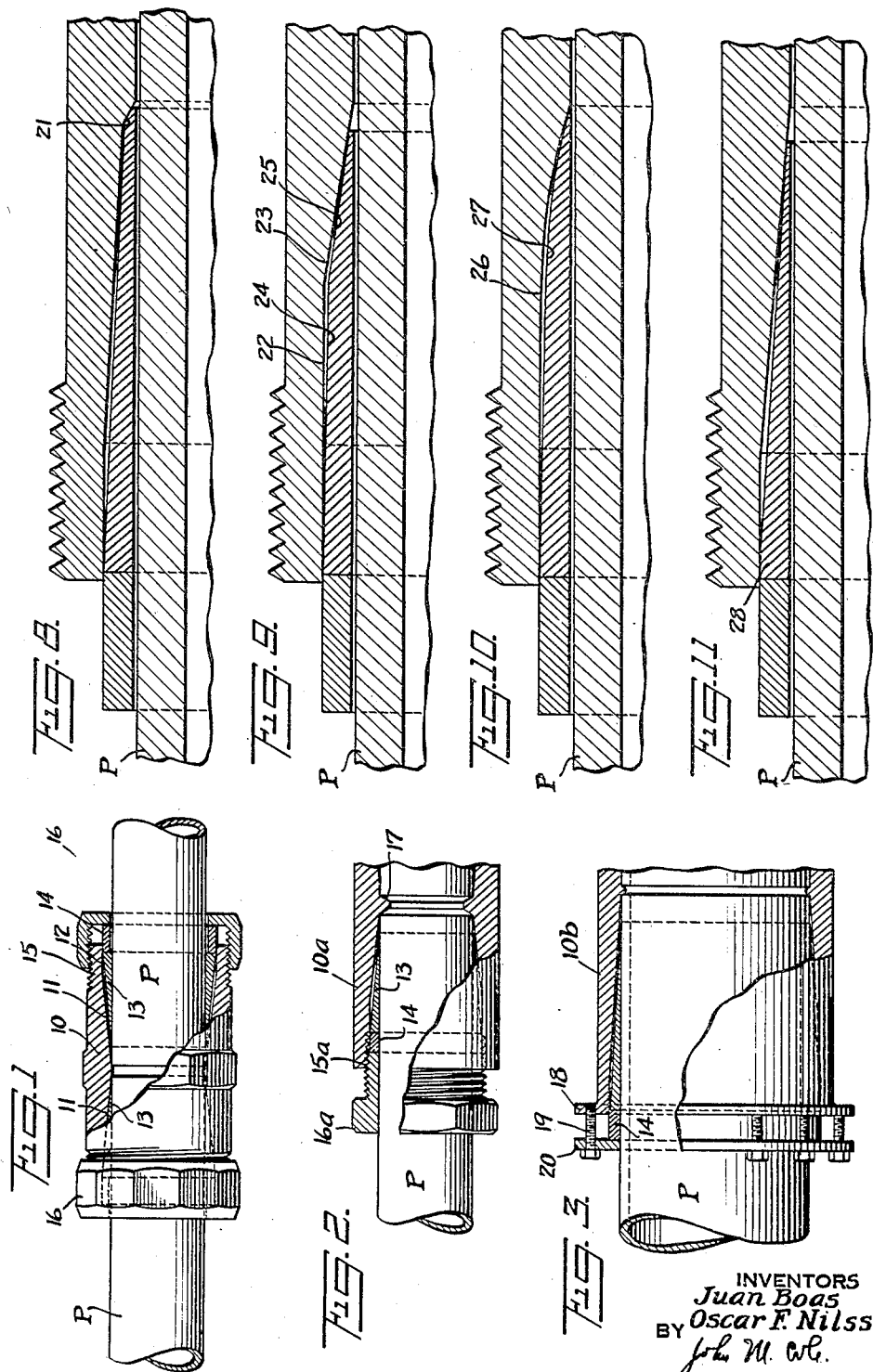
INVENTORS
Juan Boas
Oscar F. Nilsson
BY
ATTORNEY

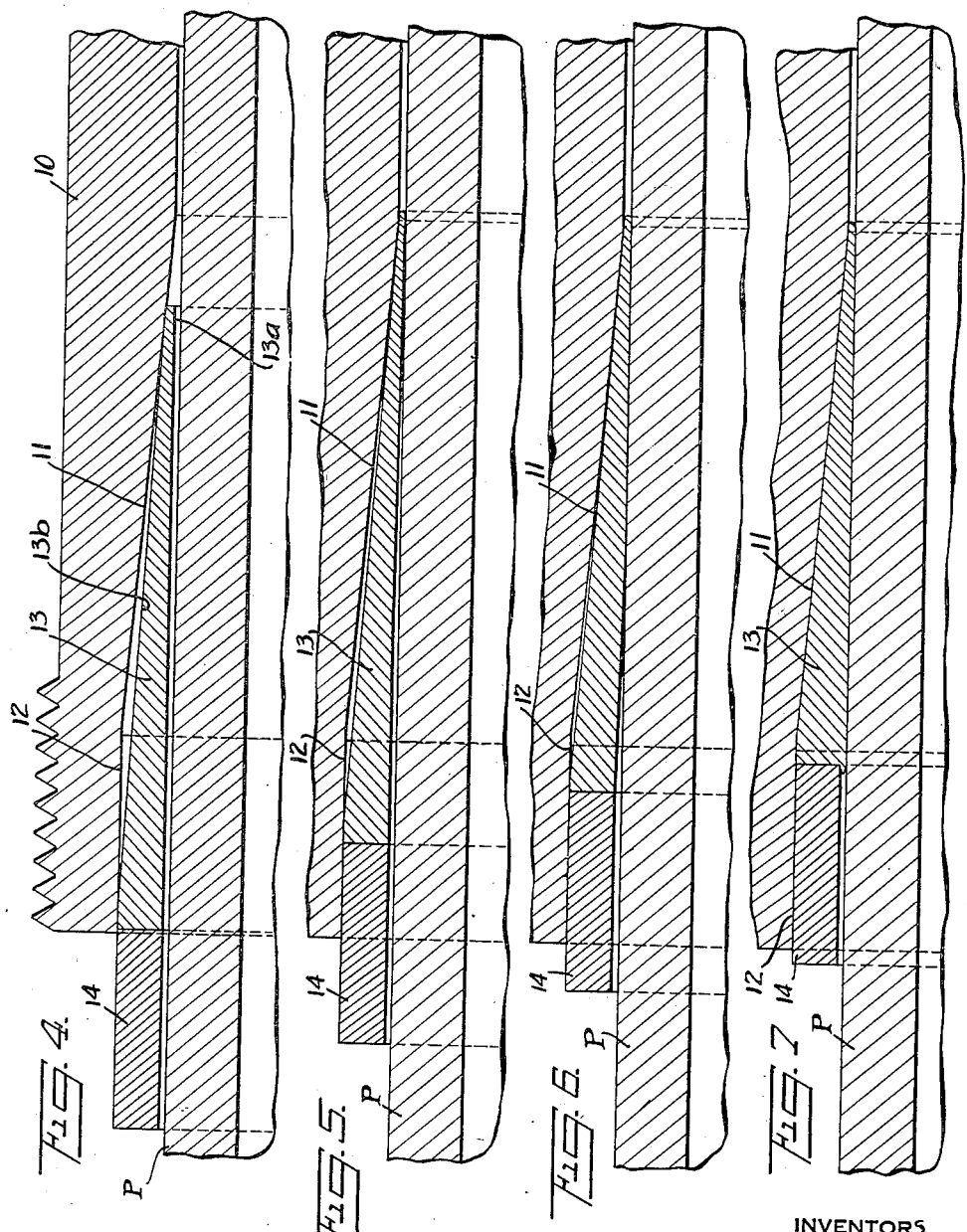

Patented Feb. 5, 1935

1,989,674

UNITED STATES PATENT OFFICE 1,989,674

COUPLING

Juan Boas, Brooklyn, and Oscar F. Nilsson, New York, N. Y.

Application August 25, 1933, Serial No. 686,706

9 Claims. (Cl. 285—122)

The present invention relates to couplings and is more particularly directed toward couplings for joining water pipes, gas pipes, electrical conduits, thin walled tubing, and the like.

The object of the present invention is to provide a rigid, durable, liquid tight and pressure tight pipe connection, made entirely of metal and characterized by the absence of threads on the pipe.

The common and almost universal practice is to join pipes together by threaded couplings or unions. The ends of each piece of pipe are threaded and some form of pipe fitting (such as a coupling, elbow, union, plug, or reducer, etc.), is threaded onto the end of the pipe. The next piece of pipe is secured to the fitting by threading it into the fitting. Not only do all these fittings have to be threaded, but it is necessary to thread each end of each piece of pipe.

This threading operation is tedious, costly, and has many mechanical imperfections. The building trades mechanic must be provided with a device for holding the pipe while cutting the threads on the pipe, and with suitable tools for such thread cutting. During the cutting of the threads and the assembly of the piping, the galvanizing or sherardizing applied to the pipes is injured by the jaws of the vise, wrench, tongs, or other tools employed so that the pipe is unprotected and subject to early corrosion at these points. Furthermore, the mechanic will generally cut the threads a little too long so as to make sure that he has room enough for coupling the pipes. These exposed threads not only are likely to corrode, but a mechanically weak part is present and is subject to breakage.

A further difficulty in employing the threaded type of pipe connections resides in that room is necessary for making the connections, as the elbows, T's, Y's, and the like must be turned around on the threads when making the connection and must be brought to the proper angular relation for the next piece of pipe. The turning of bent pieces of pipe with threaded couplings to make up the joint is very difficult unless adequate room is available for swinging the bent pipe. This frequently makes it necessary to use special couplings and short pieces of pipe to avoid using a bent piece of pipe. Furthermore, unions are necessary in many places where the piping is not continued to a free end which can be turned.

With the conventional form of piping, repairs are troublesome and expensive. Unless the pipe can be disconnected at its free end, or from a union, and back to the part which is defective, it is necessary to cut out the defective part, then unthread the loose ends while in place. A new section of the pipe must be threaded, inserted, and secured in place by unions or other special couplings.

All these defects are overcome in the threadless couplings to be described herein. No threading is necessary on the pipes. The pipes may be cut to the proper length, bent or not as necessary, and then the ends are fastened together by suitable couplings to be described. It is not necessary to thread the pipes, or to apply wrenches to them. It is obvious that the galvanizing or the sherardizing coating on the pipes will not be injured, nor will the appearance be impaired by scratches, threads or smears of paint or packing compound.

The present invention contemplates pipe couplings made up in any of the conventional shapes (straight, couplings, reducers, elbows, Y's, T's, plugs, etc.), wherein the end of the pipe is received in a housing and is secured in place by a soft metal packing sleeve forced into place so tightly as to prevent the escape of water or loss of pressure and in such a permanent manner as to be unaffected by temperature variations, or any other stress or load which may be placed on the pipe. The couplings contemplated by the present invention may be readily taken apart and used again, new packing sleeves being employed.

In carrying out the present invention, the housing (shaped according to the purpose for which it is to be used in the piping), is provided with an opening having a bore sufficiently large to receive the pipe, the packing sleeve, and a clamping ring adapted to force the packing sleeve in place. This packing sleeve is of tapered cross section, receivable within a tapered bore in the housing, and of slightly lesser angle of taper than the housing so as to contact at the inner end of the taper rather than along the entire length of the taper.

The accompanying drawings show, for purposes of illustrating the present invention, several embodiments in which the invention may take form, it being understood that the drawings are illustrative of the invention rather than limiting the same. In these drawings:

Fig. 1 is a sectional view with parts in elevation, showing a straight coupling wherein the clamping is effected by a ring threaded onto the outside of the housing;

Fig. 2 is a similar view showing a coupling wherein the clamping pressure is obtained by a ring threaded into the bore of the coupling;

Fig. 3 is a similar view showing a coupling wherein the clamping pressure is obtained by a clamping disk and bolts cooperating with a flange carried by the housing;

Figs. 4, 5, 6, and 7 are greatly enlarged sectional views showing the relation of pipe, packing sleeve, and clamping ring at various stages during the making of a joint; and Figs. 8, 9, 10, and 11 are enlarged views illustrating modified shapes or cross sections of packing sleeve and housing.

In the drawings the pipes to be coupled together are indicated by the reference letter P. One form of housing is shown at 10 in Figs. 1, and 4-7, inclusive. It is tubular and of such a size as to receive the pipes P, P. The housing 10 is bored in from each end to have a tapered section indicated at 11 and a cylindrical portion indicated at 12. The diameter of the cylindrical portion is shown the same as the maximum diameter of the tapered portion. This is the preferred arrangement.

A soft metallic sleeve is indicated at 13. This sleeve is preferably made of lead, or a lead alloy such as lead-tin solder, or other metallic substance which remains comparatively soft even though work is done on it. The inside diameter of the packing sleeve 13 is just large enough to provide clearance about the pipe P. This is indicated at 13a in Fig. 4. This clearance in practice would be of the order of 0.010 to 0.015 inches, in addition to the permissible variation of commercial pipes. The outer surface of the packing sleeve 13 is tapered as indicated at 13b (Fig. 4). The angle of taper is slightly less than the angle of taper of the bore of the housing. Tapers are in the neighborhood of 2° to 8° while a difference in taper of the order of ½° has been found to be very effective.

The maximum diameter of the packing sleeve 13 is the same as the diameter of the cylindrical bore 12, and the length such that, when the packing sleeve is inserted into the housing to bring the thin edge (at the right hand side of the figure) into contact with the inner tapered wall of the housing, the large end is just inside the housing, as shown more clearly in Fig. 4. This leaves a void or air space between the packing sleeve and the pipe (on account of variation of pipe size) and another tapering void between the packing sleeve and the housing.

A sliding ring 14 made of hard metal, preferably steel, is slidably received in the cylindrical bore 12 of the housing. This ring just fits the bore in the housing and slides freely along the pipe, the clearance being indicated in Figs. 4-7, inclusive. The housing 10 is threaded as indicated at 15 to cooperate with a threaded clamping ring 16. The rings and sleeves are carried by the housing ready to receive the ends of the pipes, as shown in Fig. 1.

When the joint is to be made up, the parts are brought to the position shown at the right hand side of Fig. 1, or as shown in Fig. 4, and the ring 16 threaded onto the housing. As the threaded ring bears on the sliding ring, there is no tendency to mutilate the packing sleeve by the rotated threaded ring. The sliding ring 14 is pressed inwardly, or toward the position indicated in Fig. 5. The result of this movement is to press the thin edge of the packing sleeve into the narrow tapered space beyond the end of the sleeve, so that the sleeve fills all the space between the pipe and housing, as indicated at the right hand side of Fig. 5. Further pressure on the sliding ring 14 will cause the ring to move to a position such as shown in Fig. 6, where it will be seen that the packing ring has been forced further toward the right. It is expanded to fill more of the void outside the ring and has been compressed to eliminate more of the void inside the ring.

The parts are so proportioned that before the sliding ring 14 is forced all the way along the cylindrical groove 12, the packing sleeve 13 has filled all the voids between the pipe and the housing, so that one now has an all metal joint with no room for any of the material to flow.

Owing to the fact that there is no bodily sliding of the packing sleeve lengthwise of the housing, and no sliding of it along the pipe after it has been squeezed against the pipe, there is practically no frictional resistance offered to the sliding movement of the pressure ring 14. As a result of this substantially all the pressure is available in compressing and upsetting the packing sleeve in a progressive manner.

It has been found entirely possible, in a construction such as herein shown, to pack the joint on ½" pipe so tightly as to stand a pressure of upwards of 4000 pounds per square inch, and that a joint packed as herein shown, is permanent and durable, and not subject to deterioration or weakening as a result of temperature changes, or bending, or hammering of the pipes. This permanence follows from the fact that there is nowhere for the packing metal to move to. It is locked in position and cannot be forced out of position so long as the pressure of the threaded ring is kept up.

The pressure developed in the packing sleeve is sufficient to force it into all the roughnesses and interstices of the pipe, so that the pipe is secured against being pulled out or turned. In fact it is readily possible to obtain sufficient pressure in the packing to permanently deform the wall of the pipe a few thousandths of an inch.

Where the coupling is for use for thick walled pipe, such as brass or iron pipe, used in water pipes, electrical conduits, and the like, the length of the packing sleeve is preferably substantially the same as the diameter of the pipe and the taper approximately that shown in the drawings.

Where the coupling is to be used on thin walled tubing, such as in gasoline lines, the packing sleeve is preferably made somewhat longer than the tube diameter. In this way the pressure developed in against the tubing is insufficient to collapse the tubing wall. A tight joint is assured. Instead of the soft metal sleeve, a similarly tapered non-metallic sleeve may be used.

In the form shown in Fig. 2, the housing 10a is internally threaded as indicated at 15a to receive a clamping nut 16a. The housing is also provided with a constriction 17 at the middle to abut against the end of the pipe P. This form of coupling cannot be slid along the pipes as can the form shown in Fig. 1.

In the form shown in Fig. 3 the housing 10b has a flange indicated at 18, tapped to receive bolts 19. These bolts pass through a ring 20 which bears on the pressure ring 14.

Figs. 8-11, inclusive, indicate modified forms of taper which may be employed in the housings and on packing rings. In Fig. 8 the end 21 of the packing ring is blunt instead of thin, as indicated at Fig. 4.

In the form shown in Fig. 9, the housing has a long, slightly tapered bore at 22, and a shorter and steeper tapered bore at 23, and the packing ring has tapered sections 24 and 25 of slightly less angle, as indicated.

In the form shown in Fig. 10 the bore 26 in the housing is of curved section, and the outer wall of the packing ring 27 is also of curved section spaced to form a void as indicated. In Fig. 11 the packing sleeve is provided with a short cylindrical portion 28.

It will, of course, be understood that any coupling may be provided with internally or externally threaded clamping rings, irrespective of whether it employs one or another of the various forms of packing ring, as illustrated. Also, that the employment of a central constriction 17 bears no relation to the type of clamping means employed.

It will also be understood that the invention may be applied to housings not only adapted to take two pieces of pipe of the same diameter, but also to housings adapted to act as reducers, L's, T's, Y's, caps, elbows, bends, and the like.

In the event one desires to disassemble a pipe line made up with these types of coupling, it is only necessary to unthread the rings and slide the entire coupling along one or the other of the pipes so as to release the pipes. The entire organization is capable of re-use, except the soft metal packing rings. These should be replaced.

It is obvious that the invention may be embodied in many forms and constructions within the scope of the claims, and we wish it to be understood that the particular forms shown are but a few of the many forms. Various modifications and changes being possible, we do not otherwise limit ourselves in any way with respect thereto.

What is claimed is:

1. In a pipe coupling, a housing having a tapered bore of slightly larger diameter at the end of the pipe to be received, a soft metal packing sleeve having a tapered outer surface of slightly less angle of taper than that of the bore and of such size as to be received over the pipe and to have its thin edge engage within the small diameter end of the tapered bore, the outer portion of the housing having a cylindrical bore, the outer end of the packing sleeve contacting with the cylindrical bore, and pressure applying means to apply pressure to the large end of the sleeve and progressively upset it until it fills the voids between the housing and pipe for the entire length of the compressed sleeve.

2. A pipe coupling as claimed in claim 1, wherein the pressure applying means includes a sliding ring fitting in the cylindrical bore and bearing on the thick end of the sleeve so that pressure is distributed uniformly to the thick end of the sleeve.

3. A pipe coupling as claimed in claim 1, wherein the pressure applying means comprises a hard metallic ring slidable along the pipe and in engagement with the thick end of the sleeve.

4. A pipe coupling as claimed in claim 1, wherein the pressure applying means comprises a hard metallic ring slidable along the pipe and in engagement with the thick end of the sleeve, and a ring threaded to the housing and bearing on the slidable ring.

5. A pipe coupling as claimed in claim 1, wherein the pressure applying means comprises a hard metallic ring slidable along the pipe and in engagement with the thick end of the sleeve, and threaded means for pressing the clamping ring against the packing sleeve.

6. In a pipe coupling, a tubular housing open at both ends and having tapered bores at the ends, soft metal packing sleeves having tapered outer surfaces of slightly less angle of taper than that of the bores and of such size as to be received over pieces of pipe received in the housing and to have their thin edges engage with the small diameter portions of the tapered bores, follower rings, and pressure applying means to apply pressure to the rings and the large end of the sleeve and progressively upset the sleeve until the entire length of the sleeve is within the bore and the sleeve fills the voids between the housing and pipe for the entire length of the sleeve, the follower ring entering the outer portions of the bore whereby reverse flow of the metal is prevented.

7. A coupling for attachment to a pipe of predetermined outside diameter comprising a housing having a cylindrical bore leading to a tapering bore adapted to receive the pipe, a readily deformable soft metal packing sleeve slidably receiving and fitting closely about the pipe, the sleeve tapering from a thin edge at an angle slightly less than the angle of taper of the bore, and having its thicker edge substantially the diameter of the cylindrical bore of the housing whereby a tapering space is formed between the housing bore and the packing sleeve, a sliding ring slidably received on the pipe and of a diameter to fit closely in the cylindrical bore, and means for forcing the ring against the sleeve, to deform the sleeve progressively from the thin edge toward the thicker edge and cause it to fill the space between the pipe and housing.

8. A pipe coupling comprising a tubular housing, each end of the bore of the housing having a tapered portion and a cylindrical portion of the same diameter as the larger end of the tapered portion, soft metal packing sleeves received in the bores, each sleeve having a cylindrical bore to receive a piece of pipe and being externally tapered at an angle slightly less than the angle of the tapered bore to form a tapering void between the sleeve and the bore of the housing, the larger end of each sleeve being received within the cylindrical portion of the housing bore, and clamping means at each end of the housing, each means including a ring adapted to fit closely into the cylindrical portion of each bore and slidable in the bore and along the pipe for applying pressure against the larger end of the packing sleeve to upset it and fill the voids.

9. Means for interconnecting a plurality of pipes, comprising a hollow member placed over the adjacent ends of each of said pipes and having a tapered inner portion, said member being provided with screw threads at its ends, tapered soft-metallic packing sleeves of slightly less taper than the tapered portion of the hollow member and adapted to be inserted into the space between said tapered inner portion and each of said pipes, a ring carried by each pipe and adapted to come in contact with one of the packing sleeves, and means at each end of the hollow member for engaging the corresponding screw threads for pressing the adjacent ring into the bore of the hollow member and against the sleeve to press the sleeve into solid contact with both the pipe and tapered portion of the hollow member.

JUAN BOAS.
OSCAR F. NILSSON.